United States Patent
Kuwabara et al.

(10) Patent No.: US 10,421,270 B2
(45) Date of Patent: Sep. 24, 2019

(54) TRANSFER TYPE INK JET RECORDING METHOD AND TRANSFER TYPE INK JET RECORDING APPARATUS

(71) Applicant: CANON KABUSHIKI KAISHA, Tokyo (JP)

(72) Inventors: Nobuyuki Kuwabara, Hachioji (JP); Fumihiro Goto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/946,923

(22) Filed: Apr. 6, 2018

(65) Prior Publication Data

US 2018/0297355 A1  Oct. 18, 2018

(30) Foreign Application Priority Data

Apr. 14, 2017  (JP) .................. 2017-080795

(51) Int. Cl.
| | |
|---|---|
| B41J 2/005 | (2006.01) |
| C09D 11/30 | (2014.01) |
| B41M 5/025 | (2006.01) |
| B41M 5/00 | (2006.01) |
| B41J 11/00 | (2006.01) |
| B41J 2/01 | (2006.01) |
| B41M 5/50 | (2006.01) |
| C09D 11/106 | (2014.01) |

(Continued)

(52) U.S. Cl.
CPC .............. *B41J 2/0057* (2013.01); *B41J 2/01* (2013.01); *B41J 11/002* (2013.01); *B41M 5/0011* (2013.01); *B41M 5/0256* (2013.01); *B41M 5/506* (2013.01); *C09D 11/106* (2013.01); *C09D 11/30* (2013.01); *C09D 11/322* (2013.01); *C09D 11/38* (2013.01); *C09D 11/40* (2013.01); *C09D 11/54* (2013.01); *B41J 2002/012* (2013.01); *B41M 5/03* (2013.01); *B41M 7/009* (2013.01)

(58) Field of Classification Search
CPC . B41J 2/0057; B41J 2/01; B41J 11/002; B41J 2002/012; B41M 5/506; B41M 5/0256; B41M 5/0011; B41M 5/03; B41M 7/009; C09D 11/30; C09D 11/54; C09D 11/40; C09D 11/38; C09D 11/322; C09D 11/106
See application file for complete search history.

(56) References Cited

U.S. PATENT DOCUMENTS 5,623,296 A  4/1997  Fujino et al.
5,981,045 A  11/1999  Kuwabara et al.
(Continued)

FOREIGN PATENT DOCUMENTS

| JP | 7-32721 A | 2/1995 |
| JP | 2013-142794 A | 7/2013 |
| WO | 94/01283 A1 | 1/1994 |

*Primary Examiner* — Yaovi M Ameh
(74) *Attorney, Agent, or Firm* — Venable LLP

(57) ABSTRACT

In a transfer type ink jet recording method, the temperature of an intermediate image in a heating step is not lower than the minimum coat forming temperature of a first resin and is not lower than the glass transition temperature of a second resin, and the temperature of the intermediate image in a transfer step is lower than the glass transition temperature of the first resin and is not lower than the glass transition temperature of the second resin.

19 Claims, 6 Drawing Sheets

(51) Int. Cl.

| | |
|---|---|
| *C09D 11/322* | (2014.01) |
| *C09D 11/38* | (2014.01) |
| *C09D 11/40* | (2014.01) |
| *C09D 11/54* | (2014.01) |
| B41M 5/03 | (2006.01) |
| B41M 7/00 | (2006.01) |

(56) References Cited

U.S. PATENT DOCUMENTS

| | | |
|---|---|---|
| 9,656,459 B2 | 5/2017 | Kuwabara et al. |
| 9,789,705 B2 | 10/2017 | Takeuchi et al. |
| 2010/0244932 A1* | 9/2010 | Lane .................... B41J 2/04548 327/520 |
| 2015/0290928 A1* | 10/2015 | Noguchi .................... B41J 2/01 347/103 |
| 2016/0230030 A1* | 8/2016 | Tominaga ............ B41M 5/0017 |

\* cited by examiner

TRANSFER TYPE INK JET RECORDING METHOD AND TRANSFER TYPE INK JET RECORDING APPARATUS

BACKGROUND OF THE INVENTION

Field of the Invention

The present invention relates to a transfer type ink jet recording method and a transfer type ink jet recording apparatus.

Description of the Related Art

Ink jet recording apparatuses are characterized by low running cost, the apparatus structure capable of achieving downsizing and applicability to color image recording using a plurality of color inks and have been widely used as output devices for computers and the like. As the digitization of photographs proceeds, ink jet recording apparatuses are also used to output images onto recording media on the basis of the digital information on photographs.

A typical ink jet recording apparatus applies inks directly onto a recording medium to form an image, and thus the type of a recording medium may affect the image quality. To address this, ink jet recording apparatuses are required to have a function capable of outputting a high quality image at a high speed regardless of the types of recording media.

A known ink jet recording apparatus meeting the above requirement is a transfer type ink jet recording apparatus including a transfer member. The transfer type ink jet recording apparatus forms an image by the following procedure: an intermediate image is first formed on a transfer member; and then the intermediate image is transferred from the transfer member onto a recording medium. In this procedure, liquid components can be removed from an intermediate image on the transfer member before the transfer of the intermediate image onto a recording medium. Subsequently, the intermediate image from which the liquid components have been removed is transferred onto a recording medium, and thus feathering of the image on the recording medium can be suppressed even when high speed printing is performed. By changing conditions for removing liquid components from an intermediate image on the transfer member, the water content in the intermediate image can be controlled, and this enables output on a wide variety of recording media.

Meanwhile, image transferability is required to be improved to transfer an intermediate image from a transfer member to a recording medium. Methods of improving the image transferability are disclosed in Japanese Patent Application Laid-Open No. H07-32721 and International Publication No. WO94/01283.

Japanese Patent Application Laid-Open No. H07-32721 discloses an apparatus using a transfer type ink jet recording method in which an ink containing a thermoplastic resin is used, a transfer drum is heated at a temperature not lower than the softening point or the melting point of the resin and a heated ink image is transferred. International Publication No. WO94/01283 discloses an apparatus using a transfer type ink jet recording method in which an ink containing a resin emulsion having a minimum film forming temperature of 50° C. or more is ejected on a transfer medium that is heated to have a surface temperature not lower than the minimum film forming temperature, and then solvent evaporation and transfer are performed.

As the digitization of photographs has become common, photoprinting by ink jet recording utilizing the above characteristics has been popularized. Silver halide photographs have high glossiness and express sophisticated feeling, and thus photoprinting by ink jet recording is also required to yields an image having high glossiness. To achieve high glossiness of an image output by the ink jet recording, the following methods can be performed. In other words, a pressure is applied to a recording medium on which an image has been output to smooth the image surface, or the ink on an image surface is heated to be softened and is flown to give a smooth coating film, for example. Alternatively, a method of recording an image on an ink jet paper having a highly glossy surface is also performed.

The method of applying a pressure to a recording medium on which an image has been output to smooth the image surface can be performed on any types of recording media and thus is applicable to various fields. Japanese Patent Application Laid-Open No. 2013-142794 discloses a gloss generating device used for a printed matter output from an image forming apparatus using a toner. By the gloss generating device, the toner image on a recording paper is heated to be melted, then a smooth surface of a belt is used to apply a pressure to the melted toner image surface, and then the toner image is cooled. Consequently, the surface of the toner image is smoothed, and an image having high glossiness can be obtained. The gloss generating device is activated on the basis of gloss information indicating whether or not gloss is developed. After passing through the gloss generating device, a highly glossy image substantially equal to a silver halide photograph can be output.

SUMMARY OF THE INVENTION

The present invention is directed to providing a transfer type ink jet recording method and a transfer type ink jet recording apparatus capable of improving the transferability of an image from a transfer member to a recording medium and improving the glossiness of an image formed on a recording medium.

In view of the above circumstances, the inventors of the present invention have performed intensive studies, as a result, have found that the constitution shown below achieves excellent performances as a transfer type ink jet recording method and a transfer type ink jet recording apparatus, and have accomplished the present invention. An aspect of the present invention provides a transfer type ink jet recording method including:

a liquid applying step of applying a liquid containing a first resin to a transfer member, an intermediate image forming step of applying, to the transfer member applied with the liquid, an ink containing a second resin in such a way as to at least partly overlap with an area applied with the liquid to thereby form an intermediate image, a heating step of heating the intermediate image, and a transfer step of transferring the intermediate image subjected to the heating step to a recording medium.

In the heating step, the temperature of the intermediate image is not lower than a minimum coat forming temperature of the first resin and is not lower than a glass transition temperature of the second resin, and in the transfer step, a temperature of the intermediate image is lower than a glass transition temperature of the first resin and is not lower than the glass transition temperature of the second resin.

Another aspect of the present invention provides a transfer type ink jet recording apparatus including:

a transfer member, a liquid applying device configured to apply, to the transfer member, a liquid containing a first resin, an intermediate image forming unit configured to apply, to the transfer member applied with the liquid, an ink containing a second resin in such a way as to at least partly overlap with an area applied with the liquid to thereby form an intermediate image, a heating device configured to heat the intermediate image, and a transfer unit configured to transfer the intermediate image heated by the heating device to a recording medium.

The temperature of the intermediate image heated by the heating device is not lower than a minimum coat forming temperature of the first resin and is not lower than a glass transition temperature of the second resin, and when the transfer unit allows the intermediate image on the transfer member to be in contact with the recording medium, a temperature of the intermediate image is lower than a glass transition temperature of the first resin and is not lower than the glass transition temperature of the second resin.

Further features of the present invention will become apparent from the following description of exemplary embodiments with reference to the attached drawings.

DESCRIPTION OF THE EMBODIMENTS

Figure 1:
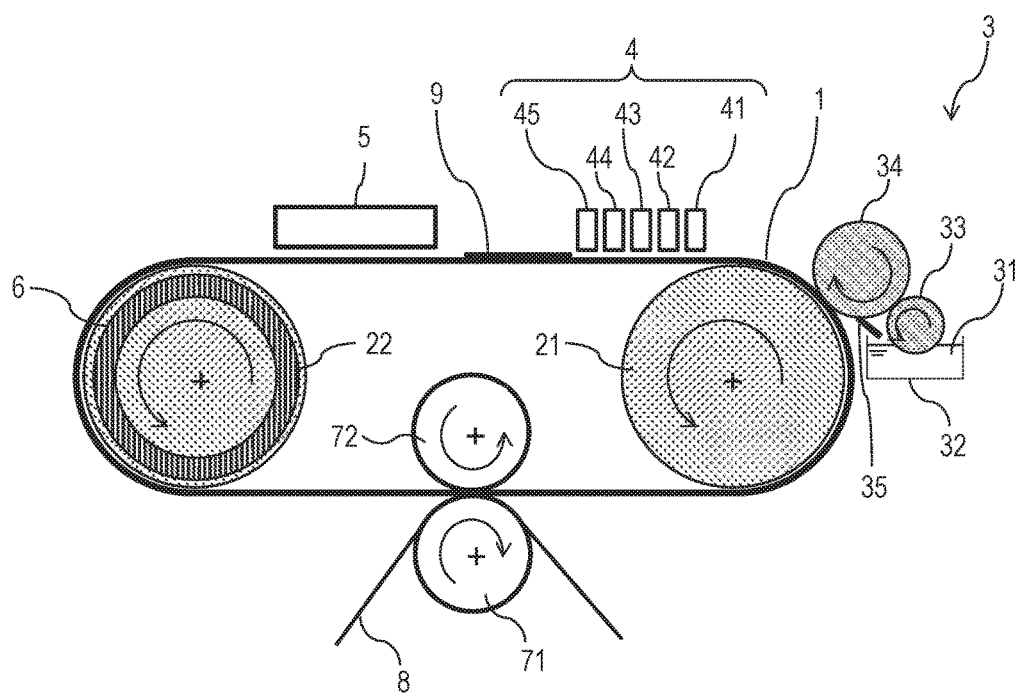
FIG. 1 is a schematic view of a transfer type ink jet recording apparatus pertaining to an embodiment of the present invention.

Preferred embodiments of the present invention will now be described in detail with reference to the accompanying drawings.

When a transfer type ink jet recording apparatus is combined with such a gloss generating device as disclosed in Japanese Patent Application Laid-Open No. 2013-142794, a printed matter having a highly glossy image quality substantially equal to silver halide photographs can be output. A transfer type ink jet recording apparatus integrated with the gloss generating device unfortunately has a complicated structure and needs an additional space for the gloss generating device. Studies by the inventors of the present invention reveal that when the glossiness of an image is intended to be improved without the gloss generating device, the transferability will be degraded unfortunately.

As disclosed in Japanese Patent Application Laid-Open No. H07-32721 and International Publication No. WO94/01283, the transferability of an image can be improved by the transfer type ink jet recording method using an ink containing a resin that is softened or melted by heating. However, neither Japanese Patent Application Laid-Open No. H07-32721 nor International Publication No. WO94/01283 suggests the application of gloss onto an image formed on a recording medium. The inventors of the present invention have studied the ink jet recording methods according to Japanese Patent Application Laid-Open No. H07-32721 and International Publication No. WO94/01283 and have found that when the image transferability is intended to be improved, the glossiness is likely to deteriorate.

The inventors of the present invention therefore have intensively studied a transfer type ink jet recording method and a transfer type ink jet recording apparatus capable of improving the glossiness of an image transferred to a recording medium while the transferability is maintained, without additional use of a gloss applying device, even with an ink containing a resin that is softened or melted by heating. As a result, the inventors of the present invention have obtained novel knowledge that an image having high transferability and high glossiness can be formed by transfer to a recording medium while thermal properties of the resin contained in a liquid used for forming a glossy layer and the resin contained in an ink used for forming an ink layer are controlled and temperature conditions of an intermediate image are controlled in a heating step and a transfer step. The present invention has been accomplished on the basis of the novel knowledge by the inventors of the present invention.

A transfer type ink jet recording method of the present invention at least includes the following steps (1) to (4).

(1) A liquid applying step of applying a liquid containing a first resin to a transfer member.

(2) An intermediate image forming step of applying, to the transfer member applied with the liquid, an ink containing a second resin in such a way as to at least partly overlap with an area applied with the liquid, thereby forming an intermediate image.

(3) A heating step of heating the intermediate image.

(4) A transfer step of transferring the intermediate image subjected to the heating step to a recording medium.

In the present invention, by controlling the temperature of the intermediate image in the heating step and the transfer step and the thermal properties (the glass transition temperatures and the minimum coat forming temperatures) of the first resin and the second resin to particular ranges, both high transferability and high glossiness are achieved.

In order to give an image having gloss intended in the present invention on a recording medium, a glossy layer including a continuous coating film that forms a face having smoothness for achieving intended gloss is provided on the image surface. In order to form the glossy layer, a liquid applying step of applying a liquid containing a first resin to an image formation surface is performed as a preceding step of an intermediate image forming step.

When an image formed on a recording medium includes an area where the application of gloss is unnecessary, the first resin (also called glossy layer-forming material) is not applied to the region on the image formation surface corresponding to the area where the application of gloss is unnecessary.

In the intermediate image forming step, an ink containing a second resin is applied onto a resin material layer formed from the first resin applied prior to the ink on the image formation surface, thereby forming an intermediate image including the resin material layer and an ink layer covering the resin material layer.

The intermediate image forming step may include, in addition to the ink application step of applying an ink to the image formation surface, a reaction liquid application step of applying the reaction liquid described later.

In the heating step performed between the intermediate image forming step and the transfer step, the intermediate image is heated at a temperature not lower than the minimum coat forming temperature of the first resin and not lower than the glass transition temperature of the second resin. As a result, an intermediate image including a glossy layer containing the first resin and the ink layer as a coating film on the glossy layer is formed. The glossy layer is formed in contact with the image formation surface.

A minimum coat forming temperature is the lower limit temperature at which a resin is softened and/or melted to form a continuous coating film that is maintained even in a solidification state after temperature decrease.

A combination of the first resin and the second resin is selected so that the minimum coat forming temperature of the first resin ($T_{L-R1}$), the glass transition temperature of the first resin ($Tg_{-R1}$) and the glass transition temperature of the second resin ($Tg_{-R2}$) satisfy the following relations in the heating step and the transfer step.

Heating Step
$T_{L-R1} < T_H$
$Tg_{-R2} < T_H$
($T_H$: heating temperature (temperature of intermediate image in heating step))

Transfer Step
$Tg_{-R2} < T_{GL} < Tg_{-R1}$
($T_{GL}$: temperature of glossy layer (temperature of intermediate image in transfer step))

The relation between the minimum coat forming temperature of the first resin ($T_{L-R1}$) and the glass transition temperature of the second resin ($Tg_{-R2}$) is not specifically limited, but when these resins are selected so as to give $Tg_{-R2} < T_{L-R1}$ and $T_H$ is set to a temperature not lower than $T_{L-R1}$, the above temperature conditions are satisfied. Such conditions are thus preferred.

The intermediate image is an extremely thin film, and thus the temperatures of the ink layer and the glossy layer included in the intermediate image are substantially equal to the temperature of the intermediate image. For the same reason, the temperature of the intermediate image in the heating step is substantially equal to the surface temperature of the transfer member in the heating step. The temperature of the intermediate image in the heating step and the transfer step can be determined by using a noncontact type thermometer (for example, an infrared thermometer).

When the first resin is a resin emulsion (also called resin particles) having a minimum film forming temperature ($MFT_{-R1}$) and a glass transition temperature ($Tg_{-R1}$), the above temperature conditions are as follows.

Heating Step
$MFT_{-R1} < T_H$
$Tg_{-R2} < T_H$
($T_H$: heating temperature (temperature of intermediate image in heating step))

Transfer Step
$Tg_{-R2} < T_{GL} < Tg_{-R1}$
($T_{GL}$: temperature of glossy layer (temperature of intermediate image in heating step))

When resin particles having a glass transition temperature higher than MFT are used as the first resin, MFT can be used in place of $Tg_{-R1}$ as the temperature condition in the transfer step.

In order to make the glossy layer into a continuous coating film layer having a smooth surface for giving intended gloss after transfer, the liquid applied to the transfer member prior to the ink contains a coating-formable resin (first resin) as the glossy layer-forming material. For the purpose, the first resin is preferably a resin emulsion that easily forms a coating by heating. When a resin emulsion is used as the first resin, the minimum film forming temperature is used as the minimum coat forming temperature. By heating the resin material layer formed from the resin emulsion applied onto the transfer member at a temperature not lower than the minimum film forming temperature, resin particles in an emulsion form contained in the resin material layer are fused with each other, and a continuous coating film (glossy layer) can be formed. When the temperature of the resin particles is not lower than the glass transition temperature during the heating, the coating film can have higher continuity.

Hence, when a resin emulsion is used as the first resin, a resin emulsion having a higher glass transition temperature than the minimum film forming temperature is preferably used. When the first resin is a resin emulsion having a higher glass transition temperature than the minimum film forming temperature, the temperature of the intermediate image in the heating step is preferably not lower than the glass transition temperature of the first resin.

In addition, together with an improvement in continuity of the coating film, the resin itself can be softened to improve the moldability on the image formation surface as the interface of the glossy layer with the image formation surface. A softened glossy layer in contact with the transfer member is leveled with the surface shape of the image formation surface thereof, and the smoothness of the image formation surface can be reproduced on the interface of the glossy layer. On this account, the smoothness of the transfer member surface on which an intermediate image is formed is important in outputting an image having gloss, and an image formation surface having sufficient smoothness to give intended gloss is used.

To apply the material for forming a glossy layer, a liquid material is preferred in consideration of handleability and application simplicity in a series of steps. From this point, the glossy layer-forming material is also preferably a resin emulsion containing water as a dispersion medium. In addition, the formulation of a resin emulsion can be controlled to achieve sufficient ejection performance for ink jet recording, and thus the resin emulsion is preferred in consideration that the application to the image formation surface of the transfer member is performed by ejection from an ink jet recording head.

When a liquid resin material is used, various coating methods, ink jet recording and the like can be used to apply the liquid resin material to the image formation surface of the transfer member. When a resin material is prepared with a liquid medium such as water and a resin material layer is formed by drying, a liquid component evaporates from the resin material layer by any application method. Due to the evaporation, the resin contained in a resin material layer may not be uniformly present in the resin material layer. For example, a liquid component is removed by treatment including heating to form voids, and the voids may be non-uniformly left in the resin material layer, or unevenness may be non-uniformly formed on the surface of a resin material layer. In such a case, the continuity of a coating film or the smoothness of the surface may be impaired. If transfer to a recording medium is performed while the surface of a resin material layer on the image formation face still has non-uniform unevenness, the unevenness on the surface is maintained on the image surface to cause uneven glossiness. In order to solve the uneven glossiness, the heating step is performed before the transfer step to allow the first resin contained in the resin material layer to soften or flow, and the coating formability and the smooth surface formability are improved.

The temperature of the intermediate image in the heating step can be set depending on the first resin, the second resin, the structure of a recording apparatus or the like so as to satisfy the temperature conditions relating to the first resin and the second resin. The temperature of the intermediate image in the heating step is not limited to particular values, but is preferably 80° C. or more to 200° C. or less and more preferably 90° C. to 150° C.

When a resin emulsion is used as the glossy layer-forming material and the temperature of a resin material layer formed by using the resin emulsion becomes equal to or higher than the minimum film forming temperature, the resin particles are fused with each other to form a continuous coating film, and concurrently the formed coating film is softened to exhibit deformability or flowability. Hence, the coating film reproduces the image formation surface of the transfer member on the interface with the image formation surface, thus the smoothness of the image formation surface is transferred to the interface of the coating film with the image formation surface, and a glossy layer can be formed before transfer. As a result, the outermost layer of an image after transfer can be a glossy layer including a continuous coating film having a smooth surface, and the image can have gloss. The minimum coat forming temperature (minimum film forming temperature) of the first resin can be measured in accordance with the test method described in JIS K 6828-2:2003 (Synthetic resin emulsion Part 2: Determination of white point temperature and minimum film forming temperature). In the Examples described below, measurement of a minimum film forming temperature was effected using a minimum film forming temperature bar (trade name: MFFTB-60; manufactured by Rhopoint Instruments). The minimum coat forming temperature of the first resin is preferably 50° C. or more to 90° C. or less and more preferably 55° C. or more to 85° C. or less. Moreover, the minimum film forming temperature of the first resin is preferably 50° C. or more to 90° C. or less and more preferably 55° C. or more to 85° C. or less.

The glossy layer-forming material may contain an additive having a certain melting point and usable to form a glossy layer, such as wax. When the first resin is used in combination with wax, the temperature of the intermediate image in the heating step is preferably not lower than the minimum coat forming temperature of the first resin and is preferably not lower than the melting point of the wax. By controlling the temperature of the intermediate image in the heating step as above, the flowability of the wax is immediately increased and the resin material layer for forming a glossy layer on the interface with the image formation surface of the transfer member can be rapidly and easily uniformized. In the subsequent process in which heating is turned off to decrease the temperature and the temperature of the glossy layer becomes lower than the melting point of the wax, the wax immediately solidifies while maintaining the uniformity, and this also effectively improves the releasability between the glossy layer and the image formation surface of the transfer member at the time of transfer. Hence, the temperature of the intermediate image in the transfer step is preferably lower than the glass transition temperature of a first resin and lower than the melting point of a wax.

The ink to form an intermediate image contains a second resin. When the heating is turned off to perform transfer, the temperature of the intermediate image can be controlled to meet the above conditions. In other words, as for the control of the temperature of the intermediate image, the temperature of the intermediate image can be controlled directly in the transfer step or can be controlled in an additional temperature control step of controlling the temperature of an intermediate image subjected to the heating step and to be subjected to the transfer step. After this temperature control, the glossy layer forms a smooth continuous coating film and solidifies, but the ink layer as a coating film to come into contact with a recording medium maintains a softened state. Hence, when the intermediate image is being released from the transfer member, the surface of a recording medium is unlikely to be roughened and thus the image transferred to the recording medium can have a high glossiness. The ink layer as a coating film can have an appropriate adhesiveness for transfer to a facing recording medium and thus can achieve high transferability.

In order to help the control of the temperature of the intermediate image in the transfer step to the above range, the intermediate image is preferably cooled between the heating step and the transfer step. In other words, a cooling step of cooling an intermediate image is preferably included. The cooling of an intermediate image is preferably performed by at least one of natural air cooling and a cooling device and is more preferably performed by both natural air cooling and a cooling device.

When an image is transferred to a recording medium through the above steps, the outermost face of the image transferred onto the recording medium has a glossy layer. The surface of the glossy layer after transfer is a face having smoothness for giving an intended gloss. The smooth surface is formed by using the softening of the first resin by heating and thus the smoothness of the image formation surface of the transfer member in contact therewith is transferred to the surface of the glossy layer after transfer. Hence, the smoothness of the image formation surface can be selected depending on an intended gloss. Studies by the inventors of the present invention have revealed that in order to achieve a glossiness substantially equal to silver halide photographs, the smoothness of the outermost face of an image is preferably made to be a surface roughness Ra of 0.1 µm or less. On the transfer member, therefore, the image formation surface on which a glossy layer is to be provided also preferably has a surface roughness (also called surface roughness of a transfer member) Ra of 0.1 µm or less. The lower limit of the surface roughness of the transfer member is 0 µm.

The thickness of the glossy layer is preferably controlled within a range from ½ of the thickness of the ink layer included in an image to substantially the same thickness as the ink layer.

To transfer an image, a pressure is applied to a transfer member and a recording medium and thus the surface unevenness degree of the recording medium may affect the smoothness of the transferred image surface. When a common printing paper is used to print a highly glossy image, a recording medium having a comparatively small surface unevenness, or a coating paper is usually used. For a photograph image, a thick printing paper is typically used. In consideration of such circumstances, the recording medium is preferably a cast-coated paper or a gloss coated paper.

Examples of the cast-coated paper include Gloria Pure White (trade name, manufactured by GOJO PAPER MFG. CO., LTD.) and Mirror Coat-Gold (trade name, manufactured by Oji Paper Co., Ltd.). A thick paper having a basis weight of 127.9 g/m² or more is preferred.

In the above description, a glossy layer having a high smoothness is provided on the surface of a transferred image to achieve high glossiness substantially equal to silver halide photographs. Output images, however, do not need high glossiness in some cases. In such a case, the liquid containing a first resin is not applied to the image formation surface, but an ink layer as a coating film can be formed as the surface of a transferred image. Before transfer, the ink layer as a coating film is in contact with the image formation surface of the transfer member in which the surface unevenness is controlled to have such smoothness as to achieve gloss, but the transfer is performed at a temperature not lower than the glass transition temperature of a second resin in the ink and thus the ink layer as a coating film in a softened state is released from the image formation surface of the transfer member. In other words, the ink layer as a coating film is still in a softened state after transfer onto a recording medium, thus the smoothness is difficult to maintain on the surface of the transferred image and no gloss is applied to the image surface.

When an output image does not need application of gloss by a glossy layer, only the liquid applying step of applying a liquid containing a material (first resin) for forming a glossy layer is not executed, but the other steps are performed. Consequently, image formation without execution of gloss application can be performed. In other words, the gloss application can be selected by further adding a liquid application selecting step (also called gloss application selecting step) of selecting "execution" or "non-execution" of the application of the glossy layer-forming material-(first resin-)containing liquid. In particular, when the glossy layer-forming material-containing liquid is applied with an ink jet recording head, only whether or not a driving signal is sent to the corresponding ink jet recording head can be switched to select the application of gloss, and thus the selection is simple. A switching signal can be sent before image signals are sent to an ink jet recording head group.

The transfer type ink jet recording apparatus pertaining to the present invention at least includes a transfer member, a liquid applying device (also called resin material applying device), an intermediate image forming unit, a heating device and a transfer unit.

The resin material applying device includes a resin material applying unit configured to apply a liquid containing a first resin for forming a glossy layer to an image formation surface of the transfer member, forming a resin material layer.

The intermediate image forming unit includes an ink applying unit configured to apply an ink containing a second resin by an ink jet method to the image formation surface with the resin material layer, forming an intermediate image including the resin material layer and an ink layer covering the resin material layer. The ink applying unit can include an ink jet device having a recording head that ejects an ink.

The intermediate image forming unit may include a reaction liquid applying unit configured to apply the reaction liquid described later to the image formation surface.

With the heating device, the intermediate image formed on the image formation surface and including the resin material layer and the ink layer covering the resin material layer is heated to a temperature not lower than the minimum coat forming temperature of the first resin and not lower than the glass transition temperature of the second resin, forming a glossy layer as a coating film containing the first resin and an ink layer as a coating film on the glossy layer or an intermediate image having a multilayer structure of these coating films.

The transfer type ink jet recording apparatus may include a temperature controlling unit. The temperature controlling unit is a unit to control the temperature of the intermediate image including the glossy layer and the ink layer after heating with the heating device so as to satisfy the above temperature conditions in the transfer step. In other words, with the temperature controlling unit, temperature control is performed so that the temperature of the glossy layer containing the first resin included in the intermediate image formed by heating with the heating device reaches a temperature lower than the glass transition temperature of the first resin and not lower than the glass transition temperature of the second resin. In other words, with the temperature controlling unit, temperature control is performed so that the temperature of the intermediate image after heating with the heating device becomes lower than the glass transition temperature of the first resin and equal to or higher than the glass transition temperature of the second resin. The transfer member subjected to the temperature control is sent to the transfer unit, and the intermediate image on the transfer member is treated in the following transfer step. The temperature controlling unit preferably includes a cooling device. When a transfer unit also serves as a temperature controlling unit, a temperature controlling unit is not necessarily required except in the transfer unit.

The application of the first resin-(glossy layer-forming material-)containing liquid to the image formation surface of the transfer member can be performed on the whole image formation surface or on a region of the image formation surface selected corresponding to a glossy layer partly applied to an image on a recording medium.

A controlling unit for selecting "execution" or "non-execution" of the application of the first resin-(glossy layer-forming material-)containing liquid to the image formation surface of the transfer member may be provided. The control of the resin material applying device by the controlling unit can be set by an instruction based on a previously set program, an instruction manually input by a user of the apparatus or the like.

The image formation surface of the transfer member is conveyed relative to the above units, and each unit works in such a way as to be synchronized with the conveyance of the image formation surface. Consequently, an image having an intended gloss can be formed on a recording medium when needed.

An example recording apparatus using the transfer type ink jet recording method pertaining to an embodiment of the present invention and an outline of the operation will next be described.

FIG. 1 is a schematic view showing an example structure of a transfer type ink jet recording apparatus of the present invention. The apparatus shown in the figure includes a transfer member 1, a reaction liquid applying device 3, an ink jet recording head group 4, a heater 6 as a heating device and a transfer roller 71 (also called pressure roller) and a rear support roller 72 included in a transfer unit.

In the transfer member 1, an image formation surface (not shown) is bonded to the outer surface of an endless belt formed from a rolled steel with a double-sided adhesive tape, and the belt is stretched and supported on a pair of rotatable, cylindrical-shaped support rollers 21 and 22. The image formation surface of the transfer member 1 is conveyed by a conveyance device including the support rollers 21 and 22. To the support rollers 21 and 22, a driving motor (not shown) for conveying the endless belt is attached. The ink jet recording head group 4 includes an ink jet recording head 41 for forming a resin material layer and ink jet recording heads 42 to 45 for forming an ink layer. In the apparatus shown in the figure, a reaction liquid applying device constituting a reaction liquid applying unit and the ink jet device constituting an ink applying unit constitute an intermediate image forming unit. In the apparatus shown in the figure, a reaction liquid coating device 3 is provided as the reaction liquid applying device.

At the downstream side in the conveyance direction of the image formation surface from the ink jet recording head group 4, a hot air dryer 5 as a heating device for evaporating and removing liquid components contained in an intermediate image 9 is provided.

The heater 6 as a heating device for making a resin material layer and an ink layer into coating films is integrated in the support roller 22. A recording medium 8 to which an intermediate image is transferred is inserted into a nip that is formed between the transfer roller 71 and the rear support roller 72 supporting a pressure from the transfer roller 71 on the back surface of the recording medium 8, together with the image formation surface having an intermediate image, and the image is transferred.

Next, the operation to form an image having a glossy layer on a recording medium 8 by using a transfer type ink jet recording apparatus having the structure in FIG. 1 will be described. As the support rollers 21 and 22 rotate, the endless belt is conveyed, or the transfer member 1 is conveyed first. Accordingly, the image formation surface of the transfer member 1 is sequentially conveyed to each treatment region. Each device arranged in the periphery works in such a way as to be synchronized with the conveyance of the image formation surface.

First, to the image formation surface of the transfer member 1, the reaction liquid coating device 3 applies a reaction liquid. The reaction liquid used here is a liquid for improving the fixability of an image. As the reaction liquid, a liquid capable of increasing the viscosity of an ink or an ink viscosity increasing liquid can be preferably used. By applying the reaction liquid and an ink to the image formation surface in such a way as to give a region in which the reaction liquid and the ink at least overlap with each other, the effect by application of the reaction liquid can be obtained. The reaction liquid and the ink are applied in any order, but the reaction liquid is preferably applied to the transfer member 1 before the application of the ink. The ink viscosity increasing effect by the reaction liquid will be described later. An appropriate amount of the reaction liquid 31 stored in a storage container 32 is drawn by the rotation of a fountain roller 33 and then is loaded in cells formed on the peripheral surface of an anilox roller 34 that is in contact with the fountain roller 33 and rotates. The reaction liquid overloaded in the cells is scraped off by a doctor blade 35 that is in contact with the anilox roller surface and is returned into the storage container 32. In addition, the anilox roller 34 is in contact with the transfer member 1 and thus the reaction liquid in the cells are transferred onto the surface of the transfer member 1.

As the support rollers 21, 22 rotate, the image formation surface of the transfer member 1 applied with the reaction liquid reaches a treatment region with the ink jet recording head group 4. The ink jet recording head 41 first applies a liquid containing a first resin (glossy layer-forming material) to the whole region on the image formation surface, and a resin material layer is formed on the image formation surface. In the apparatus shown in the figure, a resin emulsion is used as the glossy layer-forming material contained in the liquid. Resin particles contained in the resin emulsion are formed from a first resin.

The resin emulsion is applied from the ink jet recording head as liquid drops to the image formation surface. The applied glossy layer-forming material is formed from the resin emulsion and thus is arranged in a dot pattern or an island pattern on the image formation surface. The resin emulsion arranged in a dot pattern or an island pattern spreads as a liquid on the image formation surface with time and dots and/or islands come into contact with each other at many points. Hence, at the time of the subsequent heat treatment, resin particles included in the resin emulsion are fused to each other to form a film, and a coating film is likely to be formed. In other words, a coating film as a glossy layer is formed.

Each dot portion and each island portion may be formed from a single liquid drop including a glossy layer-forming material or from a plurality of liquid drops.

The image formation surface is previously applied with the reaction liquid, but liquid drops of the resin emulsion reaches the image formation surface to form a resin material layer that is in contact with the image formation surface of the transfer member.

The image formation surface of the transfer member 1 is conveyed to the ink applying unit and inks are applied by ink jet recording heads 42, 43, 44, 45 to form an intermediate image (ink image). From these ink jet recording heads, black, cyan, magenta and yellow inks are selectively ejected in response to image signals. The reaction liquid 31 on the transfer member 1 is reacted with these inks to form an intermediate image 9 (ink image) including an ink layer having a higher viscosity on the transfer member 1.

As described above, onto the image formation surface of the transfer member, the reaction liquid, the glossy layer-forming material and the ink are applied in this order, and on the transfer member, the ink layer is present on the resin material layer. As mentioned above, the adjacent resin material layer contains voids, thus through the voids, the reaction liquid can come into contact with the ink, and components in the reaction liquid can cause viscosity increase of the ink. In other words, many voids are formed in the resin material layer and thus the resin material layer does not interfere with the contact between the ink and the reaction liquid.

On the ink layer formed on the image formation surface of the transfer member, a transfer assisting agent for assisting transfer may be additionally applied. By applying the transfer assisting agent, the transferability of an image from a transfer member to a recording medium can be further improved.

The intermediate image 9 next passes under the hot air dryer 5, where liquid components such as water in the ink layer is removed by hot air and concurrently the ink layer and the resin material layer in the intermediate image 9 are also preliminarily heated.

As the transfer member 1 is further conveyed, the intermediate image 9 formed on the image formation surface of the transfer member 1 is heated by the heater 6 integrated in the support roller 22. This heating is performed from the transfer member 1 by heat transfer through the endless belt in a contact manner. In the heating, both the resin material layer and the ink layer are extremely thin layers, and thus the resin material layer and the ink layer are heated at substantially the same temperature. In the present embodiment, a resin emulsion is used as the glossy layer-forming material, and by the above heating, the resin material layer can be heated at a temperature not lower than the minimum film forming temperature of the resin emulsion. A resin emulsion typically has a higher glass transition temperature than the minimum film forming temperature, but the heating enables the resin to soften when the resin particles in the resin material layer are fused and concurrently enables the formation of a coating film along the smooth face of the image formation surface of the transfer member 1. Meanwhile, when a second resin having a glass transition temperature lower than the minimum film forming temperature of the resin emulsion of the first resin is used, the temperature of the heating device is set to a temperature higher than the minimum film forming temperature of the resin emulsion. The heating at this temperature setting enables the resin particles in the resin material layer to form a coating film of a glossy layer and enables the second resin to form a coating film of an ink layer to improve mechanical strength and adhesive power to a recording medium.

Through the heating, the intermediate image is conveyed toward the transfer step with the transfer unit. By providing a heat radiation region included in a temperature controlling unit between the heating step with the heating device 6 and the transfer step with the transfer unit, the temperature of a laminated body of the glossy layer and the ink layer as a coating film gradually decreases to reach a temperature lower than the glass transition temperature of the first resin. The position of the transfer roller 7 is controlled so that the temperature of the glossy layer is lower than the glass transition temperature of the first resin and is higher than the glass transition temperature of the second resin in the ink layer as a coating film when the intermediate image reaches the transfer roller 71.

At this time, the glossy layer included in the intermediate image is in the solid state, but the ink layer as a coating film is still in a softened state. The ink layer as a coating film included in the intermediate image and coming into contact with the recording medium 8 is still softened, and thus a sufficient adhesiveness for transfer can be imparted to an image to be transferred.

In the step, the ink layer as a coating film included in the intermediate image is stacked on the surface of the recording medium 8, and a certain pressure is applied to transfer the image. The image transferred onto the recording medium has the glossy layer on the outermost surface and thus has a smooth surface that is sufficient for gloss and is imparted by the smoothness of the image formation surface of the transfer member, and an image having an intended gloss can be formed. The transfer roller 71 included in the transfer unit has such a structure as to follow the conveyance of the image formation surface of the transfer member 1 and to apply a pressure while the rear support roller 72 supports the rear surface of the image formation surface of the transfer member 1.

A part of the image formation surface of the transfer member 1 having completed the transfer is cleaned by a cleaning mechanism provided as needed and not shown in drawings, and then is returned to the position to come into contact with the reaction liquid coating device 3. The series of operations are restarted, and the transfer member 1 is repeatedly used.

Next, each component of a transfer type ink jet recording apparatus pertaining to an embodiment of the present invention, each step in the image formation, each material used for the image formation and the like will be described.

<Transfer Member>

A transfer member has an image formation surface that serves as a substrate for forming an intermediate image and is for forming an intermediate image. The transfer member may have a structure depending on a purpose, such as a single layer structure including the same material, a multilayer structure having a surface layer and an elastic layer and a multiple structure having a surface layer, an elastic layer and a compressible layer. Each layer in the multilayer structure may include a single layer or multiple layers.

The transfer member may be supported on a support.

The support can be formed from a material that supports the transfer member and functions to transmit a required force to the whole transfer member. From the viewpoint of the conveyance accuracy and the durability thereof, the material of the support member is preferably metals, ceramics or resins, for example. Specifically, the following materials are preferred in terms of the rigidity capable of withstanding the pressure at the time of transfer, dimensional accuracy and characteristics required to reduce inertia during operation to improve the control responsivity. In other words, aluminum, iron, stainless steel, acetal resins, epoxy resins, polyimide, polyethylene, polyethylene terephthalate, nylon, polyurethane, silica ceramics, alumina ceramics and the like are preferred. These materials may be used in combination.

The transfer member preferably has an elasticity required for transfer in order to perform pressure bonding of an intermediate image to a recording medium such as paper and to transfer the image. When paper is used as the recording medium, the hardness of the transfer member is preferably a Durometer-A hardness (in accordance with JIS K6253) of 10 to 100 and more preferably 20 to 60. When a transfer member has a single layer structure, the whole single layer preferably has a hardness within the above range. When a transfer member has a multilayer structure including an elastic layer, the elastic layer preferably has a hardness within the above range.

The material of the transfer member satisfying the above hardness can be selected from materials capable of forming an intermediate image forming surface that enables the formation of an intermediate image and the transfer to a recording medium, and resins, ceramics, metals and various materials can be appropriately used. From the viewpoint of processing characteristics and the above elasticity property, various rubber material and elastomer materials can be preferably used. Examples of the rubber material include polybutadiene rubbers, nitrile rubbers such as nitrile-butadiene rubber, chloroprene rubbers, silicone-type rubbers such as silicone rubber, fluorocarbon rubbers such as fluororubber and urethane-type rubbers such as urethane rubber. Examples of the elastomer material preferably include styrenic elastomers, olefinic elastomers, polyvinyl chloride elastomers, ester elastomers and amide elastomers. Polyether, polyester, polystyrene, polycarbonate, siloxane compounds and perfluorocarbon compounds can also be preferably used, for example. In particular, nitrile-butadiene rubber, silicone rubber, fluororubber and urethane rubber are particularly preferably used from the viewpoint of dimensional stability, durability, heat resistance and the like. A transfer member formed from a composite material mixed with different materials in the above can be suitably used. Examples of such a composite material include a laminate material prepared by coating an endless belt-shaped urethane rubber with silicone rubber, a sheet prepared by laminating silicone rubber on a polyethylene terephthalate film and a laminate material prepared by forming a film of a polysiloxane compound on a urethane rubber sheet. As the composite material, a sheet prepared by infiltrating a rubber material such as nitrile-butadiene rubber and urethane rubber into a woven fabric such as a cotton fabric, a polyester fabric and a rayon fabric as a base fabric can also be suitably used.

The image formation surface of the transfer member may be subjected to an appropriate surface treatment. Examples of such a surface treatment include a flame treatment, a corona treatment, a plasma treatment, a polishing treatment, a roughening treatment, an active energy ray (UV, IR, RF, for example) irradiation treatment, an ozone treatment, a surfactant treatment and a silane coupling treatment. These treatments are also preferably performed in combination.

The surface of a glossy layer formed on the image surface transferred onto a recording medium has such a smoothness as to achieve an intended gloss, and the smoothness is defined by the smoothness of the image formation surface of a transfer member. Hence, the image formation surface of the transfer member is formed as a face having the smoothness capable of imparting an intended gloss to the surface of an image transferred to a recording medium. In order to achieve gloss substantially equal to silver halide photographs on an image transferred to a recording medium, the smoothness of the image formation surface of the transfer member is preferably made to be a surface roughness Ra of 0.1 μm or less.

Each of the support and the transfer member may be formed by using a single material or a plurality of different materials. Each of the support and the transfer member may have a single layer structure or a multilayer structure. Various adhesives, double-sided adhesive tapes and the like may be present for fixing/holding such members.

Examples of the shape of the transfer member include a sheet shape, a roller shape, a drum shape and a belt shape. When a belt-shaped transfer member is used as an endless belt, the same transfer member can be continuously, repeatedly used, and thus such a structure is particularly preferred in terms of productivity of images. The dimensions of the transfer member can be appropriately set depending on the size of an intended image.

<Reaction Liquid>

The reaction liquid contains a component that increases the viscosity of an ink (ink viscosity-increasing component). Here, the increase in viscosity of an ink is such a phenomenon that a coloring material, a resin or another component included in an ink comes into contact with an ink viscosity-increasing component and the component is chemically reacted or physically adsorbed to increase the viscosity of an ink or to causes an increase in viscosity. The increase in viscosity of an ink includes not only an increase in viscosity of an ink but also a local increase in viscosity by aggregation of some of the components included in an ink, such as a coloring material and a resin.

The ink viscosity-increasing component has the effect of lowering the flowability of an ink and/or some components included in an ink on a transfer member to suppress bleeding or beading when an intermediate image is formed.

As the ink viscosity-increasing component contained in the reaction liquid, polyvalent metal ions, organic acids, cation polymers and porous microparticles can be used, for example. Specifically preferred are polyvalent metal ions and organic acids. A plurality of types of ink viscosity-increasing components can also be preferably contained. The content of the ink viscosity-increasing component in the reaction liquid is preferably 5% by mass or more relative to the total mass of the reaction liquid.

Examples of the metal ion usable as the ink viscosity-increasing component include divalent metal ions such as $Ca^{2+}$, $Cu^{2+}$, $Ni^{2+}$, $Mg^{2+}$, $Sr^{2+}$, $Ba^{2+}$ and $Zn^{2+}$ and trivalent metal ions such as $Fe^{3+}$, $Cr^{3+}$, $Y^{3+}$ and $Al^{3+}$. Examples of the organic acid usable as the ink viscosity-increasing component include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxysuccinic acid and dioxysuccinic acid.

As the ink viscosity-increasing component, one of or a combination of two or more of components selected from the above components can be used as needed.

The reaction liquid may contain an appropriate amount of water or an organic solvent. The water used in this case is preferably a deionized water prepared by ion exchanging, for example. The organic solvent usable in the reaction liquid is not limited to particular solvents and any known water-soluble organic solvent can be used.

To the reaction liquid, various resins can also be added in order to improve the transferability or to improve the toughness of an image finally formed. By adding a resin, the adhesiveness of an intermediate image to a recording medium at the time of transfer can be increased, or the mechanical strength of a transferred image after transfer to a recording medium can be increased. Depending on the type of a resin, the water resistance of an image may be improved. The resin added to the reaction liquid can be a resin that does not aggregate by an ink viscosity-increasing component in the reaction liquid, can coexist with an ink viscosity-increasing component and have the above intended function. The resin used for such a purpose can be contained in the reaction liquid in a dissolved state, an emulsion state or a suspension state. A surfactant or a viscosity modifier can be added to appropriately control the surface tension or the viscosity thereof.

As the resin contained in the reaction liquid, a resin capable of providing the above advantageous effect can be selected from the glossy layer-forming resins exemplified later depending on the type of an ink viscosity-increasing component.

The amount of the resin can be selected from a range of 0.5% by mass or more to 15.0% by mass or less relative to the total mass of the reaction liquid.

<Reaction Liquid Application Method>

As the method of applying the reaction liquid to the surface of the transfer member, various known methods can be appropriately used. Examples of the method include die coating, blade coating, gravure coating, gravure offset coating, wire-bar coating and spray coating. The application method using an ink jet recording head by the ink jet method is also preferred. A combination of a plurality of methods is also particularly preferred. The reaction liquid can be applied to the image formation surface of the transfer member before ink application and/or after ink application. In order to further stabilize an intermediate image or to further increase the improvement effect of the transferability, the reaction liquid is preferably applied to the image formation surface of the transfer member before ink application. The reaction liquid is preferably applied to the image formation surface so that a reaction liquid application region at least partly overlaps with an ink application region.

<Glossy Layer-Forming Material (First Resin)>

The glossy layer-forming material is preferably capable of forming a colorless, transparent glossy layer that does not affect an image. Here, "colorless, transparent" means that a glossy layer is such a colorless state and has such an optical transparency as not to affect the image quality such as an image density, a hue and a resolution of an image covered with the glossy layer. Hence, the glossy layer-forming material is preferably prepared from components free from coloring materials. When a component free from coloring materials as the glossy layer-forming material has colorability to some extent but can form a glossy layer that does not affect an image, such a component can be used.

The first resin used as the glossy layer-forming material may be any resin that is usable to form a glossy layer as a continuous coating film having a smooth surface capable of imparting gloss to the surface of an image transferred to a recording medium. Specific examples of the first resin include polyolefins such as polyethylene, polypropylene, polyisobutylene, oxidized polyethylene, polytetrafluoroethylene, ethylene-acrylic acid copolymers, ethylene-ethyl acrylate copolymers and ethylene-vinyl acetate copolymers. Additional examples include homopolymers such as polystyrene, polyurethane, polyester, polyether, polyurea, polyamide, polyvinyl alcohol, poly(meth)acrylic acid and salts thereof, polyalkyl (meth)acrylate and polydiene, copolymers of two or more monomers for these homopolymers and derivatives thereof. Specifically preferred is an acrylic resin or a urethane resin. Specifically preferred is an acrylic resin or a urethane resin.

The acrylic resin is specifically preferably a copolymer at least having a hydrophilic unit and a hydrophobic unit as constitutional units as exemplified below.

Examples of the monomer having a hydrophilic group and giving a hydrophilic unit by polymerization include the following monomers. Examples include acidic monomers having a carboxy group, such as (meth)acrylic acid, itaconic acid, maleic acid and fumaric acid; acidic monomers having a phosphonic acid group, such as (meth)acrylic acid-2-ethyl phosphonate; anionic monomers including anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy(mono, di, tri, poly) ethylene glycol (meth)acrylates. Examples of the cation constituting a salt of an anionic monomer include a lithium ion, a sodium ion, a potassium ion, an ammonium ion and organic ammonium ions. The resin is preferably a resin that exhibits water-solubility when neutralized with a neutralizer such as hydroxides of alkali metals (for example, lithium, sodium and potassium) and aqueous ammonia.

Examples of the monomer having a hydrophobic group and giving a hydrophobic unit by polymerization include the following monomers. Examples include monomers having an aromatic ring, such as styrene, α-methylstyrene and benzyl (meth)acrylate; and monomers having an aliphatic group, such as ethyl (meth)acrylate, methyl (meth)acrylate, (n-, iso-)propyl (meth)acrylates, (n-, iso-, t-)butyl (meth) acrylates and 2-ethylhexyl (meth)acrylate.

The urethane resin is preferably a resin prepared by reaction of a polyisocyanate with a polyol and may be a resin prepared by reaction further using a chain extender. Examples of the polyisocyanate include aliphatic, alicyclic, aromatic and aromatic-aliphatic polyisocyanates. Examples of the polyol include polyester polyols, polyether polyols and polycarbonate polyols, and such a polyol may additionally have an acid group. In the present invention, both a polyether polyol and a diol having an acid group are preferably used as the polyol and the acid value of a urethane resin can be controlled by the proportion of a diol having an acid group. The chain extender is a compound that reacts with a remaining isocyanate group that fails to form a urethane bond, in the polyisocyanate units of the urethane prepolymer prepared by reacting a polyisocyanate and a polyol.

The first resin preferably has a weight average molecular weight of 1,000 or more to 2,000,000 or less.

When the first resin is dissolved or dispersed in water or in a liquid medium containing water and various additives to prepare a glossy layer-forming material-containing liquid, the amount of the first resin in the liquid is preferably 1% by mass or more to 50% by mass or less and more preferably 2% by mass or more to 40% by mass or less relative to the total mass of the liquid material.

A glossy layer is prepared by heating the first resin in the heating step at a temperature not lower than the minimum coat forming temperature of the first resin into a uniform, continuous coating film and is required to have such a surface smoothness as to achieve intended gloss. Meanwhile, on the transfer member before transfer, the glossy layer is in contact with the image formation surface of the transfer member and thus is required to be smoothly released from the transfer member and to be in a uniform film state at the time of transfer. From these viewpoints, the glossy layer-forming material is preferably a resin emulsion prepared by dispersing resin particles formed of a first resin in a liquid medium containing water and the like. By using the resin emulsion as the glossy layer-forming material, film forming characteristics in association with fusion of resin particles can be used to form a glossy layer satisfying the above requirement. The first resin preferably has a glass transition temperature of 70° C. or more to 110° C. or less and more preferably 80° C. or more to 100° C. or less.

In consideration of releasability of an image from the transfer member at the time of transfer, the glossy layer-forming material may contain a wax that is immediately liquefied by heating at a temperature not lower than the melting point thereof and is immediately solidified at a temperature lower than the melting point.

Specific examples of the wax include carnauba wax, paraffin wax, Sasol wax, microcrystalline wax, castor wax and polyethylene wax. These waxes can be used singly or in combination of two or more of them.

The amount of the wax can be selected from a range of 1% by mass or more to 50% by mass or less relative to the total mass of the glossy layer-forming material.

In order to control the coating-forming temperature (the minimum film forming temperature for a resin emulsion), a known film formation assisting agent, a fusing delaying agent or the like may be added as needed.

In consideration of ejection by an ink jet recording head, use of water as the main component in a solvent for preparing a liquid material helps the ejection as with a typical ink for ink jet. When the above resin is a water-insoluble resin in such a case, an emulsion of the resin dispersed in a liquid is preferably used. In this case, the minimum film forming temperature of the resin emulsion is used as the coating-forming temperature. By heating the resin material layer formed from the resin emulsion at a temperature not lower than the minimum film forming temperature thereof, resin particles of the emulsion are fused to each other to form a continuous coating film as a glossy layer. Hence, the resin emulsion is particularly preferably used in order to make the outermost surface of an image finally formed on a recording medium into a smooth surface required to achieve intended gloss.

<Application Method of Glossy Layer-Forming Material (First Resin)>

The application method of the glossy layer-forming material to the transfer member may be any method capable of forming an intended resin material layer. Various methods including an ejection method with an ink jet recording head, various coating methods and a method of planar migration or transfer of a thin layer can be used.

When a difference in gloss is intended to be expressed on the same image, the method using an ink jet recording head enables an arrangement of a resin material layer by, for example, varying the application amount of the glossy layer-forming material with regions.

<Intermediate Image Formation>

Onto the image formation surface of the transfer member applied with the reaction liquid, an ink jet recording head is used to apply an ink in response to image signals. A transfer assisting liquid for assisting transfer may be additionally applied onto the ink layer.

The operation manner of the recording head is not limited to a particular manner. For example, what is called a shuttle type ink jet recording head in which a head is swept in a direction orthogonal to the moving direction of a transfer member to form an intermediate image can be used. In addition, what is called a line-head type ink jet recording head in which ink ejection orifices are arranged in a linear manner substantially orthogonal to the moving direction of a transfer member (i.e., substantially parallel with the axis direction for a drum-shaped transfer member) can also be used.

<Ink>

Each component for preparing an ink will be described below.

[Coloring Material and Dispersion Thereof]

The ink for forming an intermediate image can be prepared by using at least a coloring material, a resin (second resin) and a liquid medium. As the coloring material, at least one of dyes, carbon black and pigments such as organic pigments usable as the coloring material in an ink can be used. The coloring material can be contained in an ink in a dissolved and/or dispersed state in a liquid medium. Specifically, various pigments, which are characterized by achieving durability and quality of printed matters, are preferred.

Examples of the pigment include known self-dispersion type pigments and dispersant-dispersion type pigments, including inorganic pigments and organic pigments, and these pigments can be used singly or in combination of two or more of them. For such a pigment, a dispersant is used as needed to stably disperse the pigment in an ink. As the dispersant for an aqueous ink, a dispersant such as a water-soluble resin having both a hydrophilic moiety and a hydrophobic moiety in the molecular structure thereof is specifically preferably used.

The content of the pigment in the ink is preferably 0.5% by mass or more to 15.0% by mass or less and more preferably 1.0% by mass or more to 10.0% by mass or less relative to the total mass of the ink.

(Water and Water-Soluble Organic Solvent)

The ink can contain, as a solvent, water or an aqueous liquid medium such as a mixture of water and a water-soluble organic solvent. The water is preferably a deionized water prepared by ion exchanging, for example. In the ink, the content of the water is preferably 30% by mass or more to 97% by mass or less relative to the total mass of the ink and is more preferably 50% by mass or more to 95% by mass or less relative to the total mass of the ink.

As the aqueous ink containing at least water as a liquid medium, an aqueous pigment ink containing at least a pigment as the coloring material can be used. The water-soluble organic solvent to be used is not limited to particular types and any known organic solvent can be used. Specific examples include glycerol, diethylene glycol, polyethylene glycol, polypropylene glycol, ethylene glycol, propylene glycol, butylene glycol, triethylene glycol, thiodiglycol, hexylene glycol, ethylene glycol monomethyl ether, diethylene glycol monomethyl ether, 2-pyrrolidone, ethanol and methanol. Needless to say, two or more solvents selected from these solvents can be used as a mixture. The content of the water-soluble organic solvent in the ink is preferably 3% by mass or more to 70% by mass or less relative to the total mass of the ink.

[Resin]

The ink contains a second resin as the resin for forming an ink layer. The second resin is heated in the heating step to form a coating film as an ink layer. The second resin is not limited to particular types, and substantially the same resins previously exemplified as the glossy layer-forming material (first resin) can be used. Specifically, the second resin is preferably an acrylic resin or a urethane resin. The resin may be present in any state of a dissolved state or a dispersed state. The second resin may have a function of reacting with an ink viscosity-increasing component in the reaction liquid to increase the viscosity by, for example, aggregation of the ink or may have a function as a pigment dispersant for dispersing a pigment in the ink.

The amount of the second resin can be selected from a range of 1% by mass or more to 30% by mass or less relative to the total mass of the ink.

The ink may contain, in addition to the pigment and the second resin, an ink viscosity-increasing resin and/or various particles in order to improve the image quality or fixability. As the ink viscosity-increasing resin, a resin capable of achieving an intended ink viscosity-increasing effect can be selected from the resins previously exemplified as the glossy layer-forming material. As the constituent materials of the particles, various materials can be selected. To further improve the image quality or fixability, a material can be specifically used within such a range as not to affect the heating temperature or the transfer temperature of an ink layer. When resin particles are used in addition the above second resin and the ink viscosity-increasing resin, the resin particles may also have a function of increasing the viscosity of an ink by a reaction with a viscosity-increasing component in the reaction liquid to cause aggregation or the like. The second resin preferably has a glass transition temperature of 30° C. or more to 70° C. or less and more preferably 40° C. or more to 60° C. or less.

[Other Additives]

Examples of the additional additives contained in the ink include various additives such as various solvents, a surfactant, a pH adjuster, an anticorrosive, an antiseptic agent, an antifungal agent, an antioxidant, a reduction inhibitor, a water-soluble resin and a neutralizer therefor and a viscosity modifier. These additives can be contained as needed and can be used singly or in combination of two or more of them.

<Heating Device for Resin Material Layer for Forming Glossy Layer and Ink Layer>

A heating device for heating the resin material layer for forming a glossy layer and the ink layer included in an intermediate image formed on the transfer member (i.e., a heating device for heating an intermediate image) is provided. Heating with the heating device is performed in order to form an intermediate image including a glossy layer as a coating film and an ink layer as a coating film by using a first resin contained in the resin material layer and a second resin contained in the ink layer. The heating device may be any device capable of performing an intended heat treatment. For example, a heating device of directly heating a laminated body of the resin material layer and the ink layer or a heating device of indirectly heating a laminated body of the resin material layer and the ink layer through a transfer member. Combination use of both the heating systems is more preferred. Specific examples of the heating means include a hot air blower such as a fan heater, a hot air dryer, an infrared heating device, a flash fixing device and a heat generating device such as a halogen heater. The support of a transfer member can be made from a material including a metal capable of performing induction heating, and a heating means of using the electromagnetic induction heating can be used.

The heating device may be used in the above removal (drying) treatment of the liquid in an ink. The heating device preferably has a structure capable of changing the heating temperature in accordance with melting or softening temperature characteristics of a resin contained in the resin material layer.

<Temperature Controlling Unit>

A conveyance region of the image formation surface on the transfer member between the heating device for forming coating films of a resin material layer and an ink layer and the transfer unit may be used as a temperature controlling unit to control the temperature of an intermediate image. This process is also called a temperature control step. The temperature control of the intermediate image can be performed by natural heat radiation (natural air cooling) or cooling using a cooling device. On the basis of the conveyance speed of an image formation surface and the temperature decrease history (pattern) of an intermediate image, the distance between the heating device and the transfer unit is set so as to enable an intended temperature control. The cooling device may be any known device.

<Transfer Unit>

To transfer an intermediate image including a glossy layer formed on the transfer member to a recording medium, the method for bringing the recording medium into contact with the transfer member or the device therefor may be any method or device capable of performing an intended transfer step. Examples of the transfer unit include a transfer unit having a transfer roller. The transfer unit may have a system of simply performing pressure contact of a recording medium with an intermediate image on a stretched transfer member by using a transfer roller or a system of overlapping an intermediate image on a transfer member with a recording medium and inserting them into a nip between a transfer roller and a facing support member.

The transfer unit may include a heating means. For a transfer unit having a transfer roller, a heating device such as a heater is preferably provided in the transfer roller to control the temperature of an ink layer at the time of transfer. This is based on the idea that the glossy layer is not melted or softened at the time of transfer and is required to be a solid coating film but the ink layer as a coating film is required to maintain a softened state for expressing adhesiveness to a recording medium. In other words, when the temperature of an ink layer is greatly decreased to fail to satisfy the requirements, a heating device for transfer can be used in order to soften the ink layer again. The heater may be provided not only in a part in the transfer roller but also over the peripheral surface of the transfer roller (surface to come into contact with a recording medium).

Figure 2:
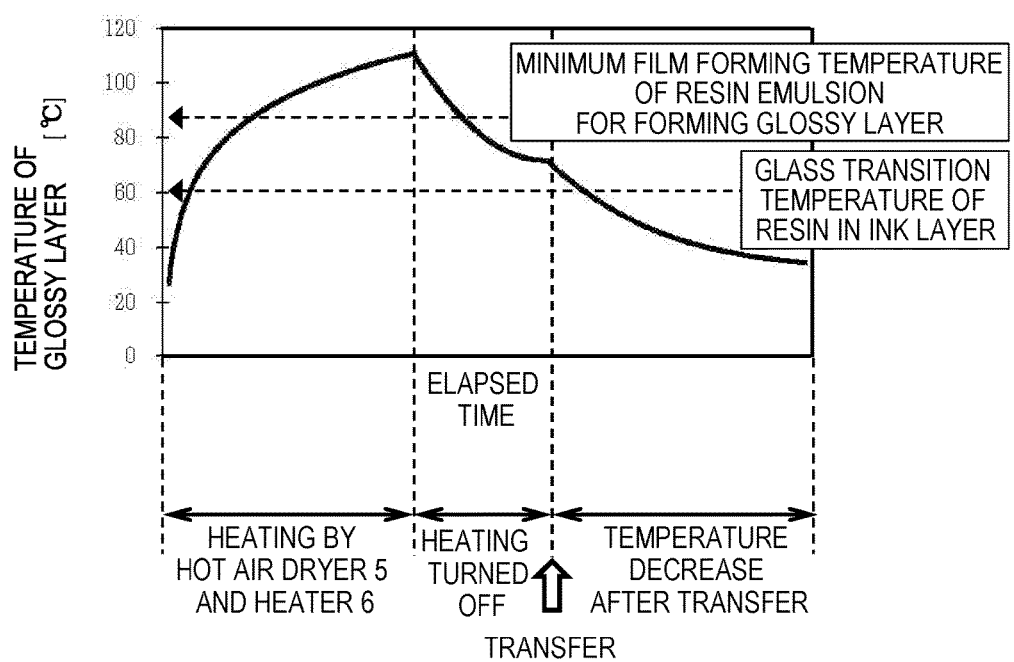
FIG. 2 is a graph showing the relation between temperature changes of a glossy layer and transfer operations.

The relation between the heating manner of a glossy layer and transfer operations will be described with reference to FIG. 2.

As described above, an intermediate image 9 including a laminated body of a resin material layer for forming a glossy layer and an ink layer applied to the image formation surface of the transfer member 1 is continuously heated by a hot air dryer 5 for removing water and subsequently by a heater 6. By the heating, the temperature of the laminated body of the resin material layer and the ink layer included in the intermediate image on the transfer member 1 is increased as the transfer member 1 is conveyed. The condition change with time is shown in FIG. 2 as a temperature change with time. The figure shows the temperature change when the first resin for forming a glossy layer is a resin emulsion containing resin particles having a minimum film forming temperature of 85° C. and the second resin contained in the ink layer is a resin having a glass transition temperature of 60° C. In FIG. 2, the vertical axis represents "temperature of glossy layer", but the vertical axis indicating temperatures less than the minimum film forming temperature (85° C.) represents the temperature of the resin material layer. The "temperature of glossy layer" is substantially the same as the temperature of the intermediate image.

When an intermediate image including a resin material layer and an ink layer is formed on the transfer member 1 and is conveyed through a heating region by a hot air dryer 5 and a heater 6, the temperature of a first resin contained in the resin material layer is increased. In the process, a second resin contained in the ink starts to aggregate and soften. The temperature of the first resin contained in the resin material layer is exceeding 85° C., which is the minimum film forming temperature of the first resin (minimum coat forming temperature of the first resin). On this account, the resin particles as the first resin start to soften and are likely to flow to fit to the image formation surface of the transfer member 1 and concurrently the resin particles are fused to each other, forming a coating film as a glossy layer. After that, the intermediate image has passed through the heater 6, and the heating is completed. The temperature of the glossy layer is then gradually decreased and becomes lower than the minimum film forming temperature of the first resin (minimum coat forming temperature of the first resin) contained in the glossy layer. Before the temperature becomes lower than the glass transition temperature of the second resin in the ink layer, the intermediate image is conveyed to a transfer operation. In the transfer operation, the adhesiveness by the softening of the ink layer functions to transfer the image including the ink layer and the glossy layer to a recording medium 8. In the transfer, the glossy layer is in a continuous coating film state and thus is readily released from the image formation surface of the transfer member 1.

According to the present invention, a transfer type ink jet recording method and a transfer type ink jet recording apparatus capable of improving the transferability of an image from a transfer member to a recording medium and improving the glossiness of an image formed on a recording medium can be provided.

EXAMPLES

The present invention will next be described specifically with reference to examples.

Example 1

A reaction liquid, a glossy layer-forming material-(first resin-) containing liquid and an ink were prepared as shown below. The component amounts with "%" are based on mass unless otherwise noted.

[Preparation of Reaction Liquid]
Citric acid: 30.0%
Glycerol: 15.0%
Nonionic surfactant: 1.0%
[trade name: Acetylenol E100 (manufactured by Kawaken Fine Chemicals)]
Water: remainder

[Preparation of Glossy Layer-Forming Material-(First Resin-)Containing Liquid 1]
Resin emulsion of styrene-acrylic copolymer (20% preparation liquid) (first resin): 50.0%
[trade name: SK-202 (manufactured by Saiden Chemical Industry Co., Ltd.)]
(average particle diameter: 180 nm; weight average molecular weight: 100,000; minimum film forming temperature: 85° C.; glass transition temperature: 96° C.)
Glycerol: 5.0%
Diethylene glycol: 7.0%
Nonionic surfactant: 0.5%
[trade name: Acetylenol E100 (manufactured by Kawaken Fine Chemicals)]
Water: remainder

[Preparation of Black Ink]
First, 10% of carbon black (trade name: Monarch 1100, manufactured by Cabot Corporation), 15% of an aqueous solution of a pigment dispersant (a styrene-ethyl acrylate-acrylic acid copolymer (second resin): an acid value of 240, a weight average molecular weight of 5000, a solid content of 20%; neutralized with potassium hydroxide), and 75% of pure water were mixed. The mixture was placed in a batch type vertical sand mill (manufactured by Aimex), and 200% of 0.3-mm zirconia beads were placed. The mixture was dispersed for 5 hours while cooled with water. The dispersion liquid was subjected to a centrifuge separator to remove coarse particles, giving a black pigment dispersion liquid having a pigment concentration of 10%.

The pigment dispersion liquid was used to prepare an ink in accordance with the following formulation.
Pigment dispersion liquid: 20.0%
(glass transition temperature of contained resin: 60° C.)
Glycerol: 10.0%
Ethylene glycol: 5.0%
Nonionic surfactant: 0.5%
[trade name: Acetylenol E100 (manufactured by Kawaken Fine Chemicals)]
Water: remainder

[Preparation of Cyan Ink]
The same procedure as for the black ink was performed with the exception that the coloring material was changed from the carbon black to Pigment Blue 15, giving a cyan ink.

[Preparation of Magenta Ink]
The same procedure as for the black ink was performed with the exception that the coloring material was changed from the carbon black to Pigment Red 7, giving a magenta ink.

[Preparation of Yellow Ink]
The same procedure as for the black ink was performed with the exception that the coloring material was changed from the carbon black to Pigment Yellow 74, giving a yellow ink.

[Recording Medium]
The following recording paper was used as the recording medium. Aurora Coat, a basis weight of 186.1 g/m$^2$ (manufactured by NIPPON PAPER INDUSTRIES CO., LTD.)

[Image Recording]
The above reaction liquid, the glossy layer-forming material-(first resin-) containing liquid and the inks were set in the transfer type ink jet recording apparatus in FIG. 1, and an image was formed on the above recording medium. The transfer member 1 used here had a surface roughness Ra of 0.06 μm. The surface roughness Ra was determined with Vertscan 4.0 manufactured by Mitsubishi Chemical Systems, Inc. Onto the transfer member 1, first, the reaction liquid 31 was applied with a 200-line anilox roller 34 in a reaction liquid coating device 3. The application amount of the reaction liquid 31 was 1 g/m$^2$ that was a required amount to cause the pigment dispersion in the ink to aggregate.

Subsequently, to the image formation surface of the transfer member 1 applied with the reaction liquid 31, the glossy layer-forming material-containing liquid 1 was ejected from an ink jet recording head 41 and applied over the full-width of the image formation surface of the transfer member 1. Subsequently, the black ink, the cyan ink, the magenta ink and the yellow ink were ejected from ink jet recording heads 42, 43, 44, 45 in response to image signals, forming an intermediate image including a resin material layer and an ink layer.

The intermediate image was then dried by a hot air dryer 5. While the intermediate image passed through a drying region by the hot air dryer 5, the intermediate image was dried by hot air at 75° C. for 5 seconds, and the water in the intermediate image was thoroughly removed.

After the drying, the intermediate image was heated by a heater 6 integrated in a support roller 22. The heater was set to give a surface temperature of 110° C., and the temperature of the image formation surface of the transfer member in contact therewith was also increased to 110° C. Accordingly, the intermediate image can be heated. While the intermediate image passed through the heating region, the intermediate image was heated at 110° C. for 3 seconds. The temperature of the intermediate image in the heating step was determined by using an infrared thermometer (not shown). During the process, the temperature of the resin material layer changed in a similar pattern to that in FIG. 2 and reached the minimum film forming temperature, 85° C., or higher while the back surface of the image formation surface of the transfer member 1 with the intermediate image was in contact with the support roller 22. As a result, the resin particles contained in the resin material layer formed a coating film while fitting to the image formation surface of the transfer member, giving a glossy layer.

Next, the heating of the image formation surface of the transfer member 1 with the intermediate image by the heater 6 was turned off, and the intermediate image was conveyed to the position of a transfer roller 71. During this conveyance, heating was not performed but heat radiation was performed. Accordingly, the temperatures of the transfer member and the intermediate image including the glossy layer and the ink layer were gradually decreased. When the intermediate image reached the position of the transfer roller 71, the temperature of the glossy layer reached 70° C. that was not higher than the glass transition temperature of the resin contained in the glossy layer. The resin in the ink had a glass transition temperature of 60° C., and thus the glossy layer was in the solid state, but the ink layer maintained a softened state at this point. In this condition, the transfer roller 71 applied a linear pressure of 600 N while following the conveyance of the intermediate image on the transfer member 1, and the intermediate image was pressed against a recording medium and transferred, forming an image on the recording medium. The temperature of the intermediate image in the transfer step was regarded as substantially the same as the surface temperature of the transfer member immediately after transfer, and the surface temperature of the transfer member immediately after transfer was determined with an infrared thermometer (not shown) as the temperature of the intermediate image.

When the image transferred onto the recording medium was visually observed, the image was satisfactory transferred onto the recording medium 8, and the formed image had a high glossiness.

Comparative Example 1

The same procedure as in Example 1 was performed with the exception that the resin emulsion of a styrene-acrylic copolymer contained in the glossy layer-forming material-(first resin-)containing liquid 1 was changed to the following resin emulsion of an acrylic copolymer to prepare a liquid 2, forming an image on a recording medium.

Resin emulsion of acrylic copolymer (20% preparation liquid)
[trade name: ACF-15 (manufactured by Saiden Chemical Industry Co., Ltd.)]
(average particle diameter: 200 nm; minimum film forming temperature: 40° C.; glass transition temperature: 60° C.)

When the image transferred onto the recording medium was visually observed, the image was satisfactory transferred onto the recording medium 8, but the formed image had a lower glossiness than the image in Example 1.

Example 2

The glossy layer-forming material-(first resin-)containing liquid 1 was changed to the following liquid 3, and the reaction liquid and the inks were set in the transfer type ink jet recording apparatus in FIG. 1 in the same manner as in Example 1.

[Preparation of Glossy Layer-Forming Material-(First Resin-)Containing Liquid 3]

Resin emulsion of styrene-acrylic copolymer (20% preparation liquid): 30.0%
[trade name: KE-1062 (manufactured by Seiko PMC)]
(average particle diameter: 80 nm; weight average molecular weight: 100,000; minimum film forming temperature: 55° C.; glass transition temperature: 96° C.)
Paraffin wax emulsion: 20.0%
[trade name: AQUACER497 (manufactured by BYK Japan KK)]
(melting point: 60° C.)
  Glycerol: 5.0%
  Diethylene glycol: 7.0%
  Nonionic surfactant: 0.5%
[trade name: Acetylenol E100 (manufactured by Kawaken Fine Chemicals Co., Ltd.)]
  Water: remainder In the example, the minimum film forming temperature of the glossy layer-forming material-containing liquid 3 was lower than the minimum film forming temperature of the glossy layer-forming material-containing liquid 1 used in Example 1, and thus the heating temperature of the intermediate image by the heater 6 was set at 100° C.

In the conditions, a series of transfer image forming operations were performed. The glossy layer-forming material contains wax, and thus the releasability of the glossy layer and the ink layer was further improved at the time of transfer. Accordingly, a coating film having an extremely high smoothness was able to be formed on the surface of the transferred image, and a highly glossy image was able to be produced.

Example 3

Figure 3:
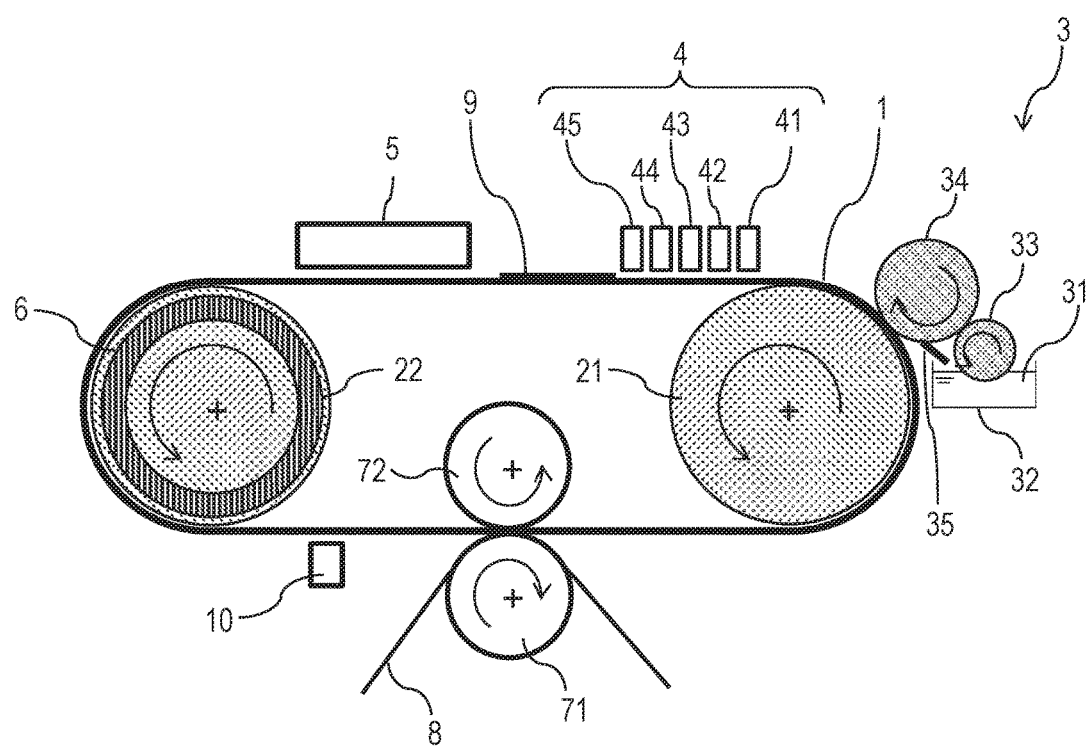
FIG. 3 is a schematic view of a transfer type ink jet recording apparatus having a temperature sensor pertaining to an embodiment of the present invention.

As shown in FIG. 3, a noncontact type temperature sensor (infrared thermometer) 10 for measuring the temperature of a glossy layer was provided in a section from turning-off of the contact of a heater 6 for heating to a transfer roller 71. The glossy layer is present between the image formation surface of the transfer member 1 and the ink layer, but the ink layer has an extremely small thickness of several to several tens of micrometers. Hence, the temperature of the ink layer on the outermost surface of the intermediate image measured by the noncontact type temperature sensor 10 can be regarded as the temperature of the glossy layer.

The temperature sensor 10 is provided in order to ascertain the temperature of the resin contained in a glossy layer at the time of transfer. In other words, the sensor is provided in order to ascertain that the temperature is within an appropriate temperature range of lower than the glass transition temperature of the first resin contained in a glossy layer and not lower than the glass transition temperature of the second resin contained in an ink layer at the time of transfer. Hence, the temperature sensor 10 is most preferably provided in the transfer unit in terms of direct measurement, but in such a case, the transfer conditions cannot be controlled after the measurement. The temperature sensor 10 is thus provided before the transfer unit.

By information on the temperature measured by the temperature sensor 10 and the position of the temperature sensor 10, the transfer temperature of the glossy layer reaching the transfer roller 71 can be forecast. When the measured temperature of a glossy layer is out of an appropriate range, the operation of the transfer type ink jet recording apparatus is controlled.

When the temperature of a glossy layer is higher than an appropriate range at the time of transfer, the temperature is required to be decreased, and the following method can be performed to decrease the temperature, for example. In other words, in an example method, the conveyance speed of the transfer member 1 is decreased to increase the time until the execution of transfer, and the temperature of the glossy layer is intended to be decreased with the time. In the example, when the temperature measured by the temperature sensor 10 is 10° C. higher than the upper limit temperature of an appropriate range, the rotation speed of the support rollers 21 and 22 are decreased by 20% to increase the time for decreasing the temperature of the glossy layer. This control can be performed by changing the driving signal in a driving controller (not shown) for the support rollers 21 and 22. If another image is simultaneously formed by the ink jet recording head group 4, a driving control system for the ink jet recording heads and the operation setting of the hot air dryer 5 and the heater 6 are also controlled in an interlocking manner.

Other methods for decreasing the temperature of a glossy layer include a method of bringing a metal plate having a high thermal conductivity into contact with the inner peripheral surface of an endless belt included in the transfer member 1 in a section to a transfer roller 71 to decrease the temperature of a glossy layer and a method of sending air by a fan or the like to decrease the temperature, for example.

When the temperature of a glossy layer is lower than an appropriate range at the time of transfer, the temperature is required to be increased, and a counter operation to the above method can be performed to increase the temperature. In other words, a method of increasing the conveyance speed, a method of bringing a heating member having a large heat capacity into contact with the inner peripheral surface of an endless belt or a method of sending warm air can be performed, for example. By control during the conveying operation of the transfer member 1 to adjust the temperature of a coating film for gloss within an appropriate range at the time of transfer, images having an appropriate gloss quality can be output constantly.

Example 4

Some output images may not need high glossiness. In such a case, the ink jet recording head 41 for applying a glossy layer-forming material-containing liquid is suspended in the transfer type ink jet recording apparatus in FIG. 1. By the suspension operation, the application of a glossy layer-forming material-containing liquid is temporarily stopped. In other words, the application of a glossy layer-forming material-containing liquid is not executed, and the intermediate image formation and the following operation are performed. The control of "execution" or "non-execution" of the driving of the ink jet recording head 41 can be performed by signal control in a driving controller (not shown) of the ink jet recording head.

By selecting the application of a glossy layer-forming material-containing liquid as above as needed, the degree of gloss of an output image can be changed.

In response to signals for forming an intermediate image by the ink jet recording heads 42 to 45, the ejection area of a glossy layer-forming material-containing liquid by the ink jet recording head 41 can be partly changed. By this system, only a part of an output image can have high gloss.

Example 5

Figure 4:
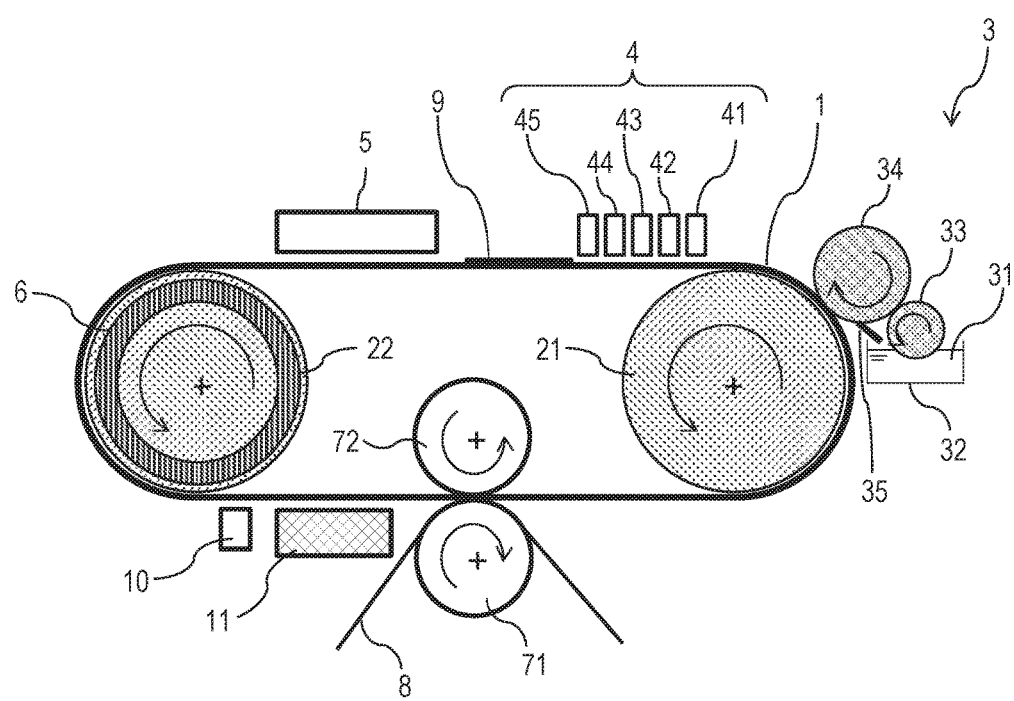
FIG. 4 is a schematic view of a transfer type ink jet recording apparatus with a cooling device for a glossy layer pertaining to an embodiment of the present invention.

To execute the transfer step, the temperature of the glossy layer formed by heating with the heating device 6 is required to be lower than the glass transition temperature of the resin contained in the glossy layer. Concurrently, the temperature is required to be equal to or higher than the glass transition temperature of the thermoplastic resin contained in the ink layer. However, depending on the whole structure of an apparatus, a sufficient distance for cooling to a temperature lower than the glass transition temperature cannot be designed from a heating device to a transfer roller in some cases. In such a case, a cooling device 11 is effectively provided in a section from a heating device to a transfer roller as shown in FIG. 4.

With the structure, based on the measurement result of a temperature sensor 10, the temperature of an intermediate image that reaches the transfer roller 71 can be forecast from the relation to the temperature of the heating device. When the temperature is not forecast to be lower than the glass transition temperature at the position of the transfer roller 71, the cooling device 11 is activated to decrease the temperature of a glossy layer. This enables control of transfer in appropriate temperature conditions.

Example 6

Figure 5:
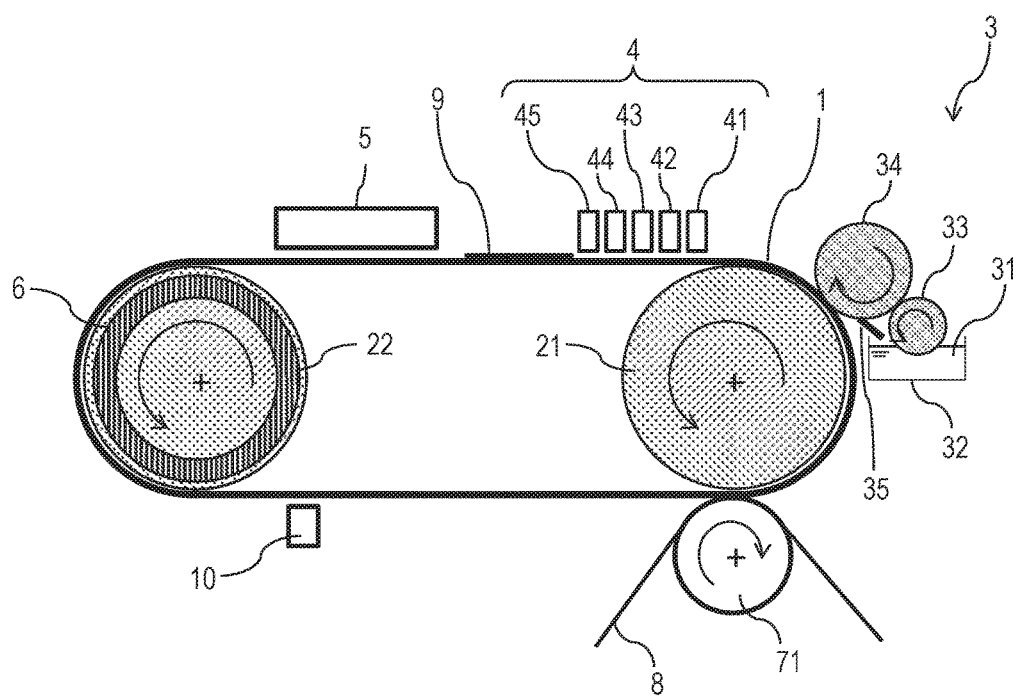
FIG. 5 is a schematic view of an embodiment in which a transfer roller of the transfer type ink jet recording apparatus pertaining to the present invention is displaced.

In FIG. 5, a transfer roller 71 is placed to face a transfer member support roller 21, and the rollers are driven in an interlocking manner. In other words, the transfer member support roller 21 also serves as a rear support roller at the time of transfer.

This structure can save component members, can increase the space in the apparatus, and can increase the time for decreasing the temperature of a glossy layer to a temperature lower than the glass transition temperature of a first resin.

Example 7

Figure 6:
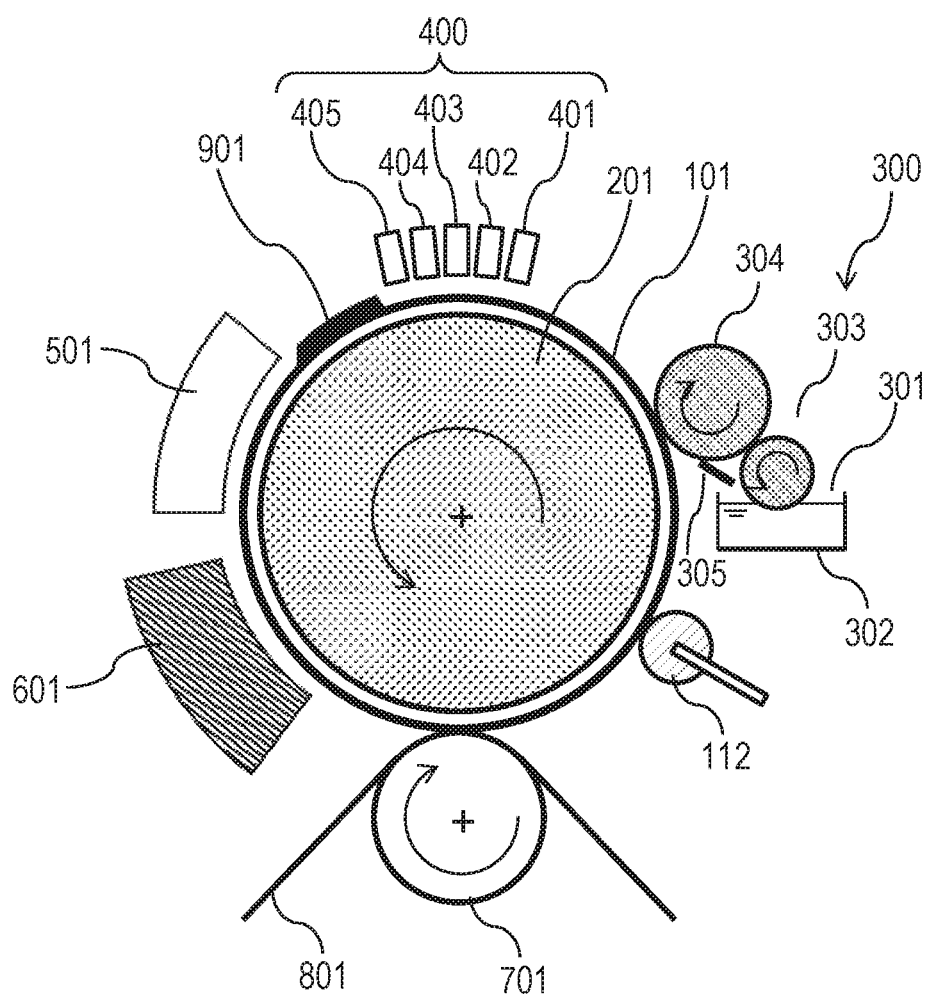
FIG. 6 is a schematic view of a transfer type ink jet recording apparatus having a sheet-shaped transfer member in an embodiment of the present invention.

FIG. 6 shows an embodiment of a transfer type ink jet recording apparatus in which a sheet-shaped transfer member is rotatable.

The apparatus shown in FIG. 6 has a sheet-shaped transfer member 101 on the outer peripheral surface of a cylindrical-shaped support 201, and as the support 201 rotates in the arrow direction, an image formation surface of the transfer member 101 is conveyed. Each device arranged around the transfer member 101 works in such a way as to be synchronized with the conveyance of the image formation surface, and the formation of an intermediate image and the transfer of the image to a recording medium are performed.

The transfer member 101 is sequentially conveyed to installation regions of a reaction liquid coating device 300 and an ink jet recording head group 400 including an ink jet recording head 401 for applying a glossy layer-forming material-containing liquid and ink jet recording heads 402 to 405 for forming an intermediate image. The reaction liquid coating device 300 has a storage container 302 storing the reaction liquid, a fountain roller 303, an anilox roller 304, and a doctor blade 305. The reaction liquid is applied to the transfer member 101 by performing the operation of the reaction liquid coating device 300 similar to that of the reaction liquid coating device 3 in FIG. 1. By these ink jet recording heads 401 to 405, an intermediate image 901 including a laminated body of a resin material layer and an ink layer is formed. Next, the intermediate image 901 is sequentially conveyed to installation regions of a hot air dryer 501, a heater 601 and a transfer roller 701 to form a highly glossy, transferred image on a recording medium 801. A cleaning unit 112 may be provided as needed.

The operation of each device for forming an image by the apparatus is the same as that of each device described in FIG. 1 with the exception that the transfer member 101 is provided on the outer peripheral surface of the support 201 and is conveyed as the support 201 rotates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-080795, filed Apr. 14, 2017, which is hereby incorporated by reference herein in its entirety.

What is claimed is:
1. A transfer type ink jet recording method comprising:
   a liquid applying step of applying a liquid containing a first resin to a transfer member;

an intermediate image forming step of applying, to the transfer member applied with the liquid, an ink containing a second resin in such a way as to at least partly overlap with an area applied with the liquid to thereby form an intermediate image;

a heating step of heating the intermediate image; and a transfer step of transferring the intermediate image subjected to the heating step to a recording medium, wherein in the heating step, a temperature of the intermediate image is not lower than a minimum coat forming temperature of the first resin and is not lower than a glass transition temperature of the second resin, and in the transfer step, a temperature of the intermediate image is lower than a glass transition temperature of the first resin and is not lower than the glass transition temperature of the second resin.

2. The transfer type ink jet recording method according to claim 1, wherein the liquid has a resin emulsion containing resin particles formed of the first resin, and the minimum coat forming temperature is a minimum film forming temperature of the resin particles.

3. The transfer type ink jet recording method according to claim 1, wherein the glass transition temperature of the first resin is higher than the glass transition temperature of the second resin.

4. The transfer type ink jet recording method according to claim 1, wherein the glass transition temperature of the first resin is 80° C. to 100° C.

5. The transfer type ink jet recording method according to claim 1, wherein the first resin is an acrylic resin or a urethane resin.

6. The transfer type ink jet recording method according to claim 1, wherein the glass transition temperature of the second resin is 40° C. to 60° C.

7. The transfer type ink jet recording method according to claim 1, wherein the second resin is an acrylic resin or a urethane resin.

8. The transfer type ink jet recording method according to claim 1, wherein the transfer member has a surface roughness Ra of 0.1 µm or less.

9. The transfer type ink jet recording method according to claim 1, further comprising a liquid application selecting step of selecting execution or non-execution of application of the liquid.

10. The transfer type ink jet recording method according to claim 9, wherein when the non-execution of application of the liquid is selected in the liquid application selecting step, the liquid applying step is suspended.

11. The transfer type ink jet recording method according to claim 1, wherein the intermediate image is cooled between the heating step and the transfer step.

12. The transfer type ink jet recording method according to claim 11, wherein the intermediate image is cooled by at least one of natural air cooling and a cooling device.

13. The transfer type ink jet recording method according to claim 1, wherein the minimum coat forming temperature of the first resin is 50° C. to 90° C.

14. The transfer type ink jet recording method according to claim 2, wherein the minimum film forming temperature of the resin particles is 50° C. to 90° C.

15. The transfer type ink jet recording method according to claim 1, wherein the temperature of the intermediate image in the heating step is 80° C. to 200° C.

16. The transfer type ink jet recording method according to claim 1, further comprising a reaction liquid applying step of applying a reaction liquid containing a component that increases viscosity of the ink.

17. The transfer type ink jet recording method according to claim 16, wherein the component that increases the viscosity of the ink is a polyvalent metal ion or an organic acid.

18. The transfer type ink jet recording method according to claim 1, wherein in the transfer step, the temperature of the intermediate image is a surface temperature of the transfer member immediately after transfer.

19. A transfer type ink jet recording apparatus comprising:

a transfer member;

a liquid applying device configured to apply, to the transfer member, a liquid containing a first resin;

an intermediate image forming unit configured to apply, to the transfer member applied with the liquid, an ink containing a second resin in such a way as to at least partly overlap with an area applied with the liquid to thereby form an intermediate image;

a heating device configured to heat the intermediate image; and a transfer unit configured to transfer the intermediate image heated by the heating device to a recording medium, wherein a temperature of the intermediate image heated by the heating device is not lower than a minimum coat forming temperature of the first resin and is not lower than a glass transition temperature of the second resin, and when the transfer unit allows the intermediate image on the transfer member to be in contact with the recording medium, a temperature of the intermediate image is lower than a glass transition temperature of the first resin and is not lower than the glass transition temperature of the second resin.

* * * * *